Patented Jan. 12, 1932

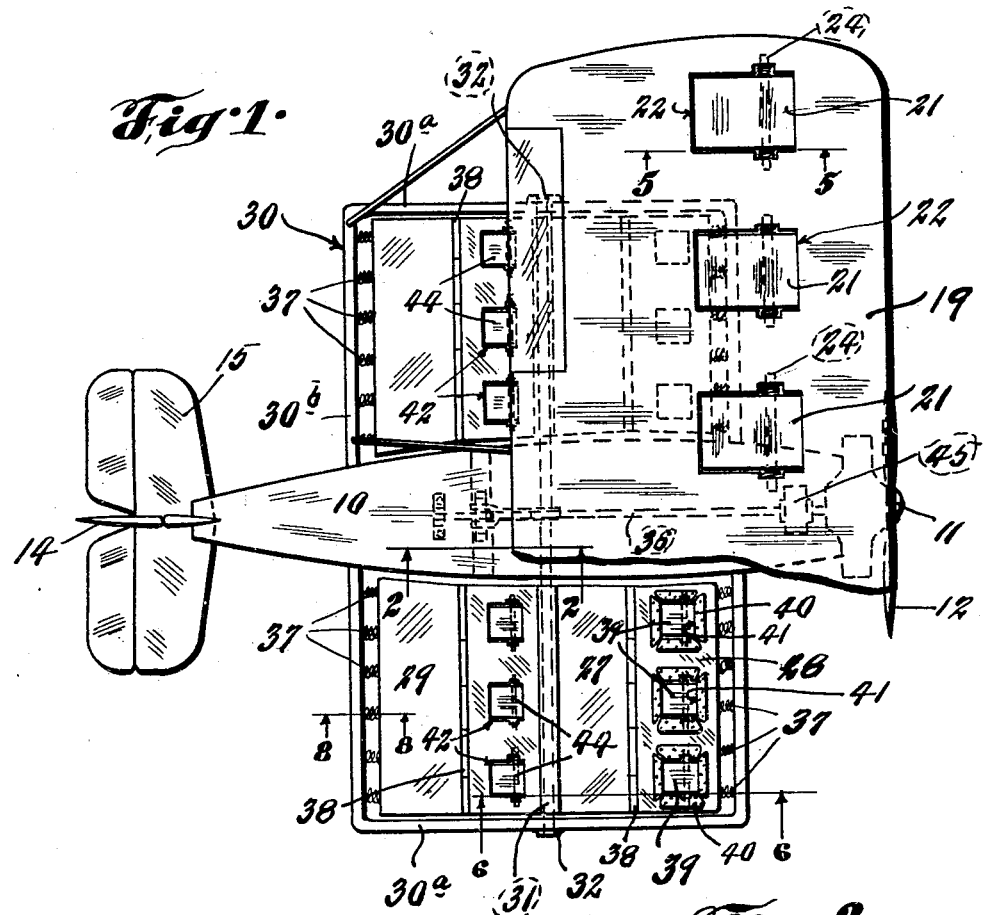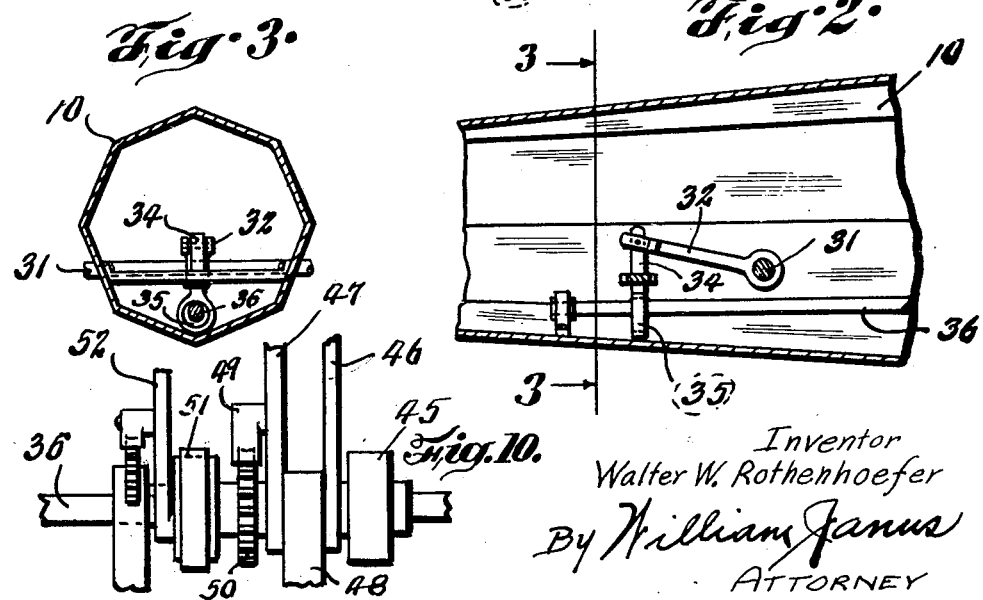

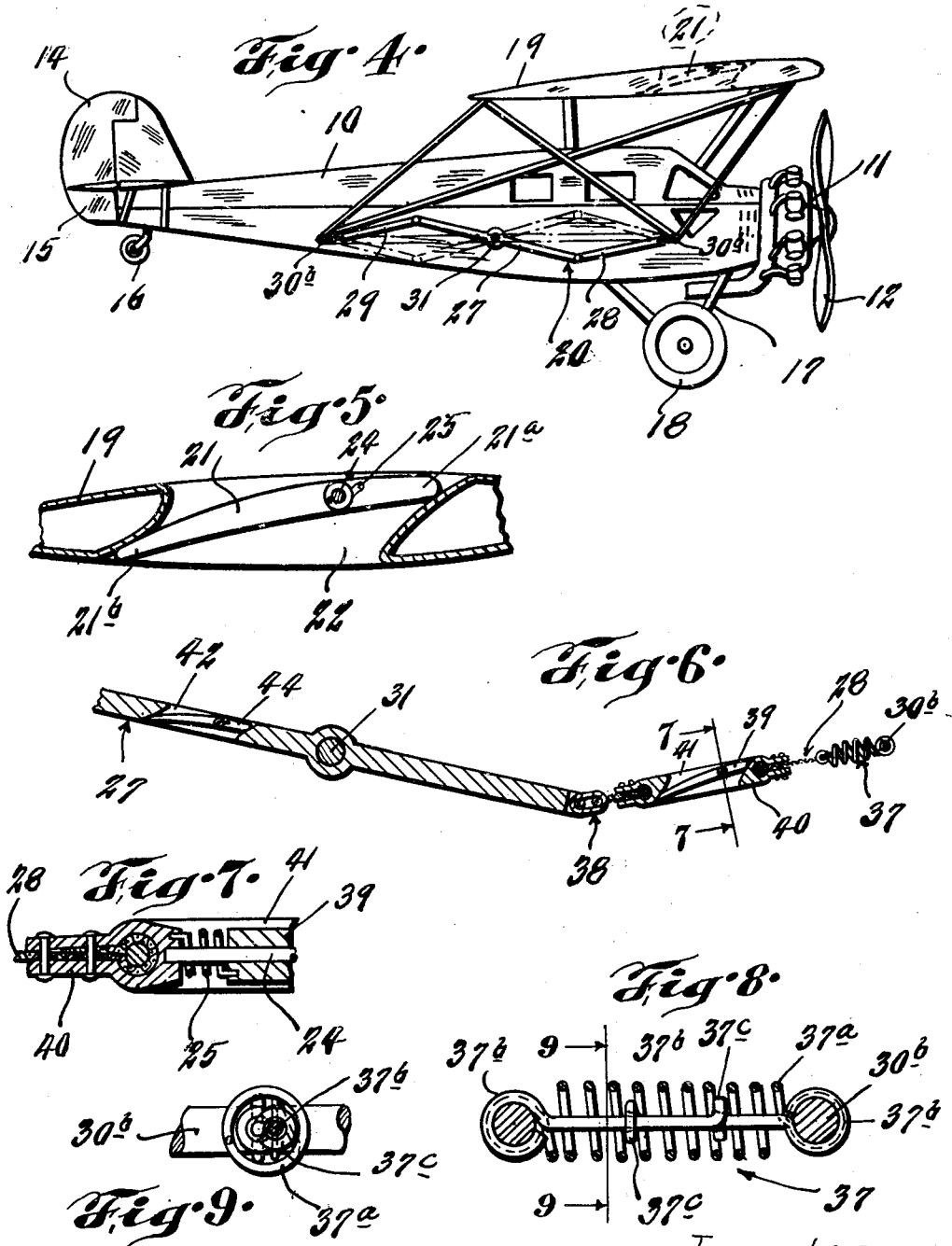

1,840,531

UNITED STATES PATENT OFFICE

WALTER W. ROTHENHOEFER, OF ST. LOUIS, MISSOURI

AIRPLANE

Application filed April 2, 1930. Serial No. 440,885.

My invention relates to new and useful improvements in airplanes.

The primary objects of the invention are to provide an airplane having power driven wings operable in a rocking motion on an axis disposed transversely of the fuselage and of the line of flight, thereby increasing the lifting power of the airplane and enabling the ascent and descent thereof in a more restricted area than that required heretofore.

Other objects of the invention are to provide an airplane having improved wings pivotally mounted on an axis disposed longitudinally of the wings and transversely of the fuselage, said wings being power driven to produce rocking motion thereof, thereby increasing the effective lift of the airplane.

A still further object of the invention is to provide an improved airplane wing comprising a rigid central portion mounted on a suitable rock shaft disposed longitudinally thereof, whereby said central portion receives rocking motion and having the front and rear edge portions flexible and operatively connected at their inner edges to the respective edges of the central portion and having their outer edges stationarily anchored whereby the rocking motion of said central portion correspondingly operates said edge portions about the fixed outer edges thereof.

Further objects of the invention are to provide an airplane, the wings of which are provided with a plurality of valves or flaps, each valve being so arranged that it will open under air pressure applied to the top surface of the wing and it will close when the air pressure is applied against the underside of said wing.

Still other objects of the invention are to provide means for operatively connecting and disconnecting the power driven wings with the power plant of the airplane and to provide means for holding said wings in angularly disposed positions when disconnected from the power mechanism.

Additional objects of the invention are to provide an airplane having its wings adjustable angularly relative to the direction of flight and for locking said wings in adjusted position.

With these and other objects in view, my invention consists in certain novel features of construction and arrangement of parts, hereinafter more fully described and claimed, and illustrated in the accompanying drawings, in which—

Figure 1 is a top plan view of my improved airplane with the upper wings partly broken away.

Figure 2 is an enlarged detail cross section taken on line 2—2 of Figure 1.

Figure 3 is a vertical transverse cross section taken on line 3—3 of Figure 2.

Figure 4 is a side elevational view of my improved airplane.

Figure 5 is an enlarged vertical cross section taken on line 5—5 of Figure 1.

Figure 6 is an enlarged vertical cross section taken on line 6—6 of Figure 1.

Figure 7 is an enlarged vertical cross section taken on line 7—7 of Figure 6.

Figure 8 is an enlarged detail cross section of one of the springs used in conjunction with the flexible wing portion.

Figure 9 is a vertical cross section taken on line 9—9 of Figure 8.

Figure 10 is a detail cross section showing the means for locking the movable wing in adjusted position.

Referring by numerals to the accompanying drawings, 10 indicates a fuselage provided at its forward end with a power plant 11 and a propeller 12 and provided at its rear end with a rudder 14, elevator wings 15 and a ground wheel 16. A landing gear 17 is provided with wheels 18. All of the above described is of usual construction.

As shown in the drawings, my airplane is shown in the present instance with an upper wing 19 and a lower wing 20, secured to the fuselage in the usual manner. The upper wing 19 may be of usual construction and is provided with a series of valves 21, which are disposed in the openings 22 formed in said wing and are pivotally mounted therein by means of shafts 24 which are disposed transversely to the longitudinal axis of the fuselage and have their ends suitably journaled in bearings formed in wing 19. The valves 21 and openings 22 are preferably rectangular and the rock shafts 24 are arranged near the forward end of each valve. A coiled spring 25 is arranged to each side of valve 21 and one end of the spring is anchored to said valve while the other end is anchored in wing 19, the tension of the spring being such as to maintain said valves in closed positions, as shown in Figure 5.

Each valve 21 is shaped to represent a miniature wing having a blunt front end 21$^a$ and a thin rear end 21$^b$, the upper surface of the valve being slightly curved upwardly while the underside is almost straight. The ends of the valve are in overlapping engagement with the respective end walls of valve opening 22 and are so disposed relatively thereto as to permit the opening of the valve to bring the forward end of the valve upwardly and the rear end downwardly. Thus when the valve is moved into open position it is disposed angularly relatively to the line of flight with the forward end raised above the wing and with the rear end extending below said wing.

The airplane shown in the drawings is of the bi-plane type having lower wings 20. Each wing is composed of three longitudinal sections, namely, the central section 27, the front section 28, and rear section 29. A frame 30 is fixed to the fuselage 10 and encircles said sections and forms a support therefor. Central section 27 is mounted on a rock shaft 31 which has bearing in said fuselage and extends therefrom and has its outer ends mounted in bearings 32 fixed to member 30$^a$ of each frame 30.

Shaft 31 receives rocking movement through the medium of a rock arm 32 which is fixed on said shaft and has its outer end operatively connected to one end of a rod 34. This rod is operatively mounted on an eccentric 35 which is fixed on an actuating shaft 36. The latter is operated by a suitable source of power, such as engine 11. Thus when said shaft is actuated, rocking motion is imparted through shaft 31 to central portion 27. The front and rear wing sections 28 and 29 are yieldingly anchored at their outer edges to longitudinal members 30$^b$ of frame 30. Preferably these yielding connections are effected by means of springs or resilient devices 37. The inner edges of sections 28 and 29 are flexibly connected to the outer edges of section 27 by suitable hinge or pivotal connections 38. Thus as the section 27 is actuated, the hinge connections 38 and the yieldable connections 37 permit the sections 28 and 29 to move in accordance with the movement of said section 27. The forward section 28 is preferably formed of fabric and is provided with a series of valves 39 which are similar in construction to valves 21. As the section 28 is formed of fabric, a frame 40 of rigid material is secured at spaced intervals to said section and is provided with an opening 41 within which valve 39 is operatively mounted.

The rear half 27$^a$ of section 27 is provided with a series of valve openings 42 in which are operatively mounted valves 44 which are similar in shape and operation to valves 39. The rear section 29 is preferably formed of rigid material and does not carry any valves. Both valves 30 and 44 are preferably held in closed positions by suitable spring means, similar to springs 25 of valves 21. The purpose and operation of these valves are similar to valves 21, said valves being movable into open positions during the upward movement of the portions in which they are mounted and being held in closed positions during the downward movement of the respective portions. The valves when in moved positions release overhead pressure and each wing acts as an individual wing. The vibratory wings 20 serve to increase the lifting power of the plane and permit landing and take-off of the plane within a restricted space. The constant vibration of the wings prevents ice formation thereon, thereby adding to the safety of the plane. The rocking motion of the wings transfers the effective load surface first on the forward half and then on the rear half of the wing. The pressure against the wings is increased on the rear half during the downward movement thereof. Upon the upward movement of the rear half, the load is again taken up by the forward half which is moving downwardly. These vibratory wings can be also used to propel the plane without the use of a propeller.

The yielding connections 37 consist of a coiled spring 37$^a$, the ends of which are anchored to the respective parts, and a pair of cooperating members 37$^b$, one end of each of which is anchored to the respective part and the inner end of which is formed to provide a laterally disposed perforate head which is slidably arranged on the shank portion of the other member. Normally these inner ends are spaced from each other and only the tension of the spring holds the parts in proper positions. In case of breakage of the spring, however, or the extreme flexing thereof, the inner ends 37$^c$ of the respective members 37$^b$ will become interengaged and prevent the disengagement of the sections from the supporting frame 30.

Revoluble shaft 36 is controlled by a clutch 45 which is operable by a handle 46. Thus said shaft can be disengaged from the engine 11 when it is desired to render a wing 20 stationary. When said wings are stationary they can be moved or adjusted in any desired position by means of a handle 47 which is freely mounted on a bearing 48 concentrically with shaft 36 and is provided with a pawl 49 which is adapted to engage a gear 50 fixed on shaft 36. Thus by rocking handle 47 in the proper direction while pawl 49 is in engagement with toothed wheel 50, shaft 36 can be rocked to bring the wings 20 into desired positions. When shaft 36 is in operative engagement with engine 11, pawl 49 is held in disengaged relation with wheel 50. A suitable brake 51 is provided on shaft 36 and is actuated by a brake handle 52. The purpose of this braking mechanism is to lock the shaft 36 in adjusted position.

The valves are substantially the same camber as the wings when in open position that force the air currents downwardly against the undersides of the wings. The actuation of the vibratory wings 20 draws the air currents under the rising portion of the wing and on the downward movement thereof forces the air under the other portion of the wing. Thus as the forward part of the power wing is moved downwardly, air pressure is created which is caused to pass rearwardly under the rear part of the wing. On the upward movement of the wing portions the respective valves open and allow the air to pass under said wing portions.

By disconnecting the power from the vibratory wings and using hand control to adjust said wings, the lateral center of the lip can be shifted forwardly or rearwardly as desired, the adjustable wings thereby providing a horizontal up and down control. These adjustable wings also provide a gliding angle or a lifting angle and may also be used for starting and braking angles. Said wings 20 can also be adjusted for slow or swift action and for light and heavy loads. Thus it will be seen that by the use of the vibratory adjustable wings, I increase the adjustment range of the airplane and provide better control thereof.

While I have shown the preferred forms of my invention, it is obvious that minor changes may be made without departing from the spirit thereof.

I claim:

1. An airplane comprising in combination with a fuselage and a power plant therefor, of a wing having a plurality of spaced openings, a valve pivotally mounted in each opening for closing the same, the pivot of said valve being disposed transversely to said fuselage and the ends of each valve being in overlapping engagement with the respective ends of said opening whereby each valve is movable angularly to said wing with the forward end of the valve disposed above said wing.

2. An airplane comprising in combination with a fuselage, a rock shaft extending transversely from said fuselage, wings fixed intermediate said edges to said shaft whereby said wings are actuated on axes disposed transversely of the line of flight, a revoluble shaft arranged in said fuselage and operatively connected to said rock shaft for imparting rocking motion thereto, power-driven means for actuating said revoluble shaft, and manually controlled means for disengaging said revoluble shaft from said power-driven means and locking said revoluble shaft in fixed position whereby said wings can be retained in desired adjusted positions.

3. An airplane comprising in combination with a fuselage, a rock shaft extending transversely from said fuselage, wings fixed intermediate said edges to said shaft whereby said wings are actuated on axes disposed transversely of the line of flight, each of said wings being provided with a plurality of valve openings, a valve disposed in each opening and pivotally mounted in said wing whereby said valves are opened and angularly disposed relatively to the line of flight when pressure applied to the upper surface of said valve is greater than the pressure applied to the underside thereof, a revoluble shaft arranged in said fuselage and operatively connected to said rock shaft for imparting rocking motion thereto, power-driven means for actuating said revoluble shaft, and manually controlled means for disengaging said revoluble shaft from said power-driven means and locking said revoluble shaft in fixed position whereby said wings can be retained in desired adjusted positions.

4. In an airplane construction a wing comprising three longitudinal sections, the central section being pivotally mounted on an axis disposed transversely of the fuselage, the outer sections having their outer edges yieldingly anchored and having their inner edges flexibly connected to the outer edges of said central section.

5. In an airplane construction, the combination with a fuselage, of a wing comprising three longitudinal sections, a frame extending transversely from said fuselage and enclosing said sections, a rock shaft journaled in said fuselage and having its ends journaled in the end members of said frame, the central wing section being fixed to said rock shaft and operable thereby transversely of the line of flight, the outer sections having their outer edges yieldingly anchored to said frame and having their inner edges flexibly connected to the outer edges of said central section so as to cooperate therewith during the rocking movement thereof.

6. In an airplane construction, the combination with a fuselage, of a wing comprising three longitudinal sections, a frame extending transversely from said fuselage and enclosing said sections, a rock shaft journaled in said fuselage and having its ends journaled in the end members of said frame, the central wing section being fixed to said rock shaft and operable thereby transversely of the line of flight, the outer sections having their outer edges yieldingly anchored to said frame and having their inner edges flexible connected to the outer edges of said central section so as to cooperate therewith during the rocking movement thereof, the forward wing section being provided with a plurality of valve openings, and a valve pivotally arranged in each opening and operable in correlation with the movement of said section.

7. In an airplane construction, the combination with a fuselage, of a wing comprising three longitudinal sections, a frame extending transversely from said fuselage and enclosing said sections, a rock shaft journaled in said fuselage and having its ends journaled in the end members of said frame, the central wing section being fixed to said rock shaft and operable thereby transversely of the line of flight, the outer sections having their outer edges yieldingly anchored to said frame and having their inner edges flexibly connected to the outer edges of said central section so as to cooperate therewith during the rocking movement thereof, the rear half of said central section being provided with a plurality of spaced valve openings, a valve pivotally mounted in each opening and operable into open position during the upward movement of said portion and movable into closed position during the downward movement thereof.

8. In an airplane construction, the combination with a fuselage, of a wing comprising three longitudinal sections, a frame extending transversely from said fuselage and enclosing said sections, a rock shaft journaled in said fuselage and having its ends journaled in the end members of said frame, the central wing section being fixed to said rock shaft and operable thereby transversely of the line of flight, the outer sections having their outer edges yieldingly anchored to said frame and having their inner edges flexibly connected to the outer edges of said central section so as to cooperate therewith during the rocking movement thereof, the forward wing section being provided with a plurality of valve openings, a valve pivotally arranged in each opening and operable in correlation with the movement of said section, the rear half of said central section being provided with a plurality of spaced valve openings, a valve pivotally mounted in each opening and operable into open position during the upward movement of said portion and movable into closed position during the downward movement thereof.

In testimony whereof I hereunto affix my signature this 8th day of March, 1930.

WALTER W. ROTHENHOEFER.